United States Patent

[11] 3,583,188

[72] Inventor Masanobu Nakamura
22-8, Matsubara-cho, 5-chome, Setagaya-Ku, Tokyo, Japan
[21] Appl. No. 800,952
[22] Filed Feb. 20, 1969
[45] Patented June 8, 1971

[54] AUTOMOBILE REAR AXLE HOUSING AND METHOD OF MAKING SAME
2 Claims, 7 Drawing Figs.
[52] U.S. Cl.................................................... 72/58, 72/367
[51] Int. Cl.................................................... B21d 26/04, B21d 53/90
[50] Field of Search.......................................... 72/54, 57, 58, 59, 60, 61, 62, 367, 354; 29/421, 463, 480; 74/607

[56] References Cited
UNITED STATES PATENTS
| | | | |
|---|---|---|---|
| 1,886,831 | 11/1932 | Murray | 72/58 |
| 1,926,353 | 9/1933 | Spatta | 72/367 |
| 2,205,893 | 6/1940 | Unger | 72/367 |
| 3,273,916 | 9/1966 | Tillery | 72/367 |
| 3,335,590 | 8/1967 | Early | 72/58 |

FOREIGN PATENTS
| | | | |
|---|---|---|---|
| 610,114 | 3/1935 | Germany | 72/54 |
| 385,146 | 3/1965 | Switzerland | 72/57 |

Primary Examiner—Richard J. Herbst
Attorney—Zarley, McKee & Thomte

ABSTRACT: The method for making the housing for rear axles of automobiles wherein a tubular steel member is first reduced in its diameter throughout its length with the exception of the middle part to the required diameter of the desired axle housing for carrying the rear axle of a vehicle. Next a tubular member is subjected to a bulging stress to reduce the wall thickness at the middle part of the tubular member. The internal stress is maintained by hydraulic pressure inside the tubular member which precisely shapes the enlarged area and prevents the formation of wrinkles in the shaped material. Lastly, the tubular member is shaped by pressing it from outside while maintaining the pressure inside. The final shaping is affected by means of a die suitable to give the final shape as desired for a rear axle. A rear axle housing is provided having a reduced wall thickness toward the bulged center of the housing from the opposite ends thereof so that the section modulus is substantially uniform from end to end of the housing.

PATENTED JUN 8 1971 3,583,188

INVENTOR
MASANOBU NAKAMURA
BY Zarley, McKee & Thomte
ATTORNEY

AUTOMOBILE REAR AXLE HOUSING AND METHOD OF MAKING SAME

The housings for real axles of automobiles are conventionally manufactured by pressing a pair of steel pipes and combining them by welding into a single tubular housing. The housings are also manufactured by molding an enlarged body for containing the differential and joining it to a pair of steel pipes. These types of housings are relatively expensive and require complicated processes for shaping, machining and finishing for forming the products.

Hence, a third method has been proposed for making the housing from a single steel pipe by a plastic deformation process. In the method heretofore proposed, however, many technical problems were left unsolved. As there is a limit to the deformation of a steel pipe by cold working, it was difficult to obtain the required size, shape and strength of the rear axle housing. Thus, the manufacturing of the rear axle housing from a single steel pipe is still not worked commercially.

An object of this invention is to provide an improved economical and effective method of making the housings for rear axles of automobiles from a single tube of metal.

The housing of a real axle for automobiles has at its center portion an enlarged chamber accommodating the differential. Each end of the housing is connected to the frame of the vehicle by means of a spring. Thus, the bending moment of the housing, as a beam, is distributed uniformly between the supports by the springs. The bending stress of a beam may be represented by the following equation:

$$\Sigma = M/Z$$

where $M$ is the bending moment; and $Z$ is the section modulus. The section modulus may be represented approximately, when it is a hollow metal pipe of thin wall thickness, as follows:

$$Z = 0.8 d^2 t$$

where $d$ refers to the average diameter of the pipe; and $t$ to wall thickness. Thus, when a metal pipe has an enlarged diameter portion and if the wall thickness is equal, the section modulus will be proportioned to the square of the diameter. Supposing that the center portion of the rear axle housing has a diameter three times the diameter of the housing on either side, the bending stress at the center portion will be:

$$6_1 = M/Z_1 = M/0.8 \times 3^2 \times 1 = AM/7.2$$

while the bending stress on either side will be:

$$6_2 = M/Z_2 = M/0.8 \times 1^2 \times 1 = AM/0.8$$

Thus, it means that the wall thickness at the enlarged center portion of the housing will serve by a thickness one-ninth of the wall thickness on either side of the housing for the same section modulus.

The present invention involves a method of making a rear axle housing for vehicles comprising the steps of first reducing the diameter of tubular steel material with the exception of the center portion thereof, to the required diameter for carrying an axle half shaft, then bulging the center portion of said material for reducing the wall thickness thereof and finally applying pressure to the exterior of said tubular material against a controlled interior pressure until said material is deformed to the required shape. The third step of pressing is effected by means of a die. Thus the formed housing has a gradually reduced wall thickness toward the bulged center of the housing from the opposite ends thereof so that the section modulus may be established substantially uniform from end to end of the housing. According to the invention, the housing requires no machining and hardening. As the housing of the invention is manufactured by a plastic deformation of a steel pipe at ambient temperature, it increases deformation resistance as will be expressed as "work-hardenability." Due to the work-hardenability, i.e., the increase of yield point by the work-deformation, the housing becomes very strong and is capable of withstanding heavy loads.

The invention will now be described with reference to the accompanying drawings which illustrate diagrammatically the improved process of the invention.

Figure 1:
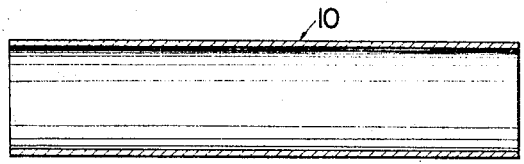
FIG. 1 illustrates one form of a tubular steel material in section.
Figure 2:
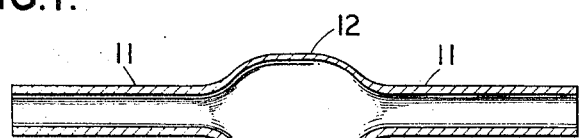
FIG. 2 represents the same material after it has been deformed at the first step of the process.

In FIG. 1, the numeral 10 designates a tubular steel blank. The tubular blank 10 is subjected to the first shaping such as by a rotary swaging machine so that the blank is reduced in diameter on either side 11. However, the center portion 12 of the blank 10 maintains its original diameter as shown in FIG. 2.

Figure 3:
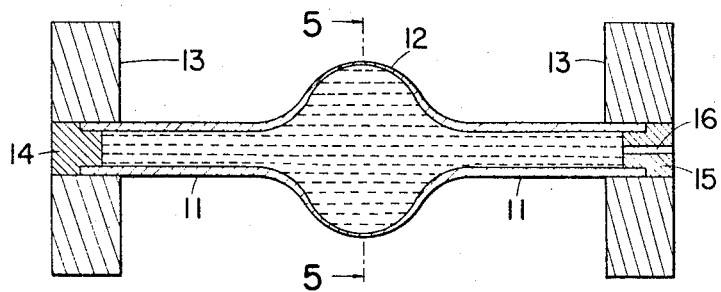
FIG. 3 illustrates the same material after it has been deformed at the second step.

The tubular blank 10 is then subjected to a bulging process at the second step as shown in FIG. 3, which bulging is effected by introducing a hydraulic pressure into the interior of the tubular blank 10. At the second step, the tubular blank 10 is held at both its ends by suitable chuck devices 13. Each end opening of the tubular blank 10 is hermetically sealed by plugs 14 and 15. One of the plugs, e.g., plug 15 has a fluid passage 16 for connecting the interior of the blank 10 with a source of hydraulic pressure (not shown).

The bulging process from the first step (FIG. 2) to the second step (FIG. 3) may be performed using a subsidiary die (not shown) which may be disposed in embracing relation to the blank 10. This die has a cavity corresponding to the shape which is required at the end of the second shaping process. Such die may be advantageously used for forming the contour and for preventing abnormal deformation of the blank.

The bulging causes the wall thickness of the tubular blank at its center portion 12 to be gradually reduced toward the center of the blank.

Figure 4:
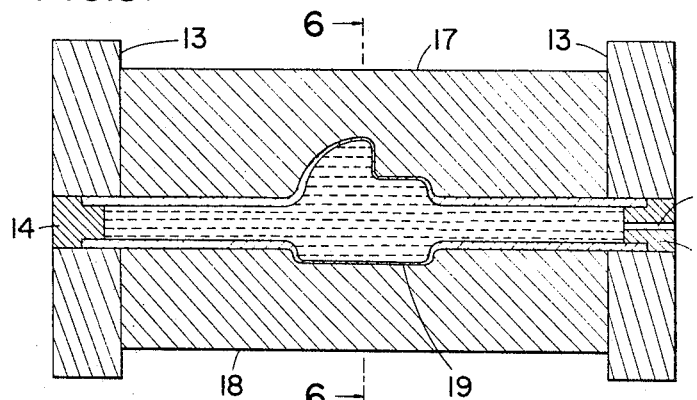
FIG. 4 illustrates the same material after it has been deformed at the third step.

The bulged tubular blank is then subjected to the final shaping by means of dies 17 and 18, as shown in FIG. 4, controlling the hydraulic pressure inside the tubular blank. The dies 17 and 18 have the contour required for shaping of a rear axle housing.

Figure 5:
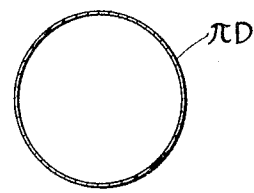
FIG. 5 is a diagrammatic cross section on line 5—5 of FIG. 3.
Figure 6:
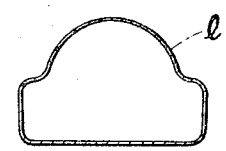
FIG. 6 is a diagrammatic cross section on line 6—6 of FIG. 4.

The deformation ratio between the second step (FIG. 3) and the third step (FIG. 4) is not critical, but it is preferable to process and control the shaping of the final product in such a manner that the circumferential length $l$ of the cross section at the center of the housing (FIG. 6) is substantially equal to or less than the circumference $\pi D$ of the cross section at the center of the bulged center portion 12 (FIG. 5) of the blank at the second step.

Figure 7:
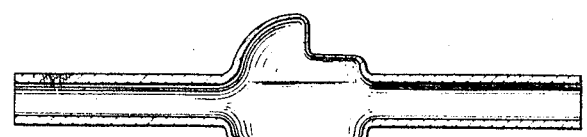
FIG. 7 shows the product as the rear axle housing in section.

At any rate, the last shaping is performed by the dies 17 and 18 against a back pressure developed by the fluid introduced into the tubular blank 10. Thus, it is possible to manufacture the housing with a precise shape as required by a real axle housing. At the last shaping, the housing is preferably formed to have a flat side 19. This flat side 19 is machined, after removal from the dies 17 and 18, to form an opening 20 leaving an inwardly projected flange 21 which is adapted to mount the rim of the differential carrier 22 (FIG. 7).

The back pressure or the hydraulic pressure inside the tubular blanks serves to prevent the formation of wrinkles in the finished product. The back pressure is controlled in accordance with the ratio of deformation between the second step and the third step. The invention is preferably operated so that there is established a ratio $l \leq \pi D$ on the cross section at the center of the housing. It will be appreciated that the closer the maximum circumferential length $l$ of the product is to the circumference $\pi D$ of the bulged tubular blank, the less back pressure is required to shape the final product. In operation, the back pressure is adjusted in accordance with the contour of the die. When the final product has a sharp corner or corners, the back pressure is increased so as to effect a deep drawing of the material.

Some changes may be made in the construction and arrangement of my AUTOMOBILE REAR AXLE HOUSING AND METHOD OF MAKING SAME without departing from the rear spirit and purpose of my invention, and it is my intention to cover by my claims, any modified forms of structure or use of mechanical equivalents which may be reasonably included within their scope.

I claim:

1. A method of making a rear axle housing for automobiles comprising the steps of reducing the diameter of a tubular steel material, with the exception of the center portion thereof, to the required diameter for carrying the axle half shaft, bulging the center portion of said tubular material for reducing the wall thickness thereof and pressing said material from the outside by a die against a controlled back pressure developed by a fluid introduced into the interior of said tubular material until said material is deformed to the contour of said die.

2. The method of claim 1 wherein the section modulus after the bulging step is established substantially uniform from end to end of the housing.